United States Patent
Dos Remedios

(10) Patent No.: US 8,954,804 B2
(45) Date of Patent: Feb. 10, 2015

(54) SECURE BOOT CIRCUIT AND METHOD

(75) Inventor: Alwyn Dos Remedios, Vaughan (CA)

(73) Assignee: ATI Technologies ULC, Markham, Ontario (CA)

(*) Notice: Subject to any disclaimer, the term of this patent is extended or adjusted under 35 U.S.C. 154(b) by 755 days.

(21) Appl. No.: 12/173,456

(22) Filed: Jul. 15, 2008

(65) Prior Publication Data

US 2010/0017659 A1    Jan. 21, 2010

(51) Int. Cl.
*G06F 11/00* (2006.01)
*G06F 21/51* (2013.01)
*G06F 11/22* (2006.01)
*G06F 21/57* (2013.01)

(52) U.S. Cl.
CPC ............ *G06F 21/51* (2013.01); *G06F 11/2284* (2013.01); *G06F 21/575* (2013.01); *G06F 2221/2105* (2013.01)
USPC .......................................................... 714/31

(58) Field of Classification Search
USPC .......................................................... 714/31
See application file for complete search history.

(56) References Cited

U.S. PATENT DOCUMENTS

| | | | | |
|---|---|---|---|---|
| 5,875,293 | A * | 2/1999 | Bell et al. | 714/27 |
| 2003/0084316 | A1* | 5/2003 | Schwartz | 713/200 |
| 2004/0243823 | A1* | 12/2004 | Moyer et al. | 713/200 |
| 2004/0243978 | A1* | 12/2004 | Walmsley | 717/120 |
| 2005/0138409 | A1* | 6/2005 | Sheriff et al. | 713/200 |
| 2005/0246523 | A1* | 11/2005 | Mauro et al. | 713/156 |
| 2006/0282658 | A1* | 12/2006 | Tang | 713/2 |
| 2008/0250406 | A1* | 10/2008 | Carpenter et al. | 718/1 |
| 2009/0327741 | A1* | 12/2009 | Zimmer et al. | 713/183 |

* cited by examiner

*Primary Examiner* — Scott Baderman
*Assistant Examiner* — Jigar Patel
(74) *Attorney, Agent, or Firm* — Faegre Baker Daniels LLP

(57) ABSTRACT

A circuit includes a circuit identification storage module and a control module. The circuit identification storage module stores circuit identification information. The control module receives the circuit identification information and in response thereto selectively performs a secure boot procedure or a test boot procedure. The control circuit performs the secure boot procedure when the circuit identification information indicates that the circuit is a production circuit. The control circuit performs the test boot procedure when the circuit identification information indicates that the circuit is a test circuit. A related method is also disclosed.

20 Claims, 5 Drawing Sheets

US 8,954,804 B2

SECURE BOOT CIRCUIT AND METHOD

FIELD

The present disclosure generally relates to program images, and more particularly, to securely booting program images.

BACKGROUND

Advances in technology and consumers demand for such technology increasingly drive electronic devices, such as mobile handheld devices, to higher levels of capability. The processing power available today allows many of these demands to be met using sophisticated processors such as System-on-Chip (SOC) integrated circuits that provide high levels of capability and flexibility through being programmable.

Software and software development have become critical to providing new and improved capabilities, features and functions of electronic devices. As such, there is a need to protect the software from misappropriation, or alteration for malicious purposes. For example, software may be misappropriated or altered even at the integrated circuit level by attacks directed toward specific features and functions of the chip. At the same time, it may be necessary to gain access to software for debugging, updating or for various development needs.

One method to reduce misappropriation of software is to verify whether a particular program image is authorized to run on a particular circuit. Referring to FIG. 1, exemplary operations that can be performed to securely boot a program image by verifying the image are generally identified at 100. The process starts at 102 when a program image is to be loaded in a circuit. At 104, the circuit reads the program image. At 106, the circuit reads a production public key. At 108, the circuit uses the production public key to verify whether the program image is authorized to run on the circuit. At 110, the circuit determines whether the verification is successful. If the verification is successful, the circuit loads the program image at 112 and the process ends at 114. However, if the verification is not successful, the circuit fails the program image boot at 116 and the process ends at 114.

Although this method is useful in verifying whether a program image is authorized to run on a particular circuit, there are a number of drawbacks. One such drawback is that developmental program images also have to be verified. Verifying program images during development and/or debugging can increase time required to create new program images, which can also increase the cost of new program images. In addition, because the production public key is used to verify developmental program images, an increased number of program images are linked to the production public key. By having a large number of program images linked to the production public key, cryptanalysis techniques could be used to determine the production public key. Therefore, it is desirable, among other things, to provide a circuit and method that is capable of verifying whether a program image is authorized to run on a particular circuit without the aforementioned drawbacks.

BRIEF DESCRIPTION OF THE DRAWINGS

The disclosure will be more readily understood in view of the following description when accompanied by the below figures, wherein like reference numerals represent like elements.

DETAILED DESCRIPTION

Figure 1:
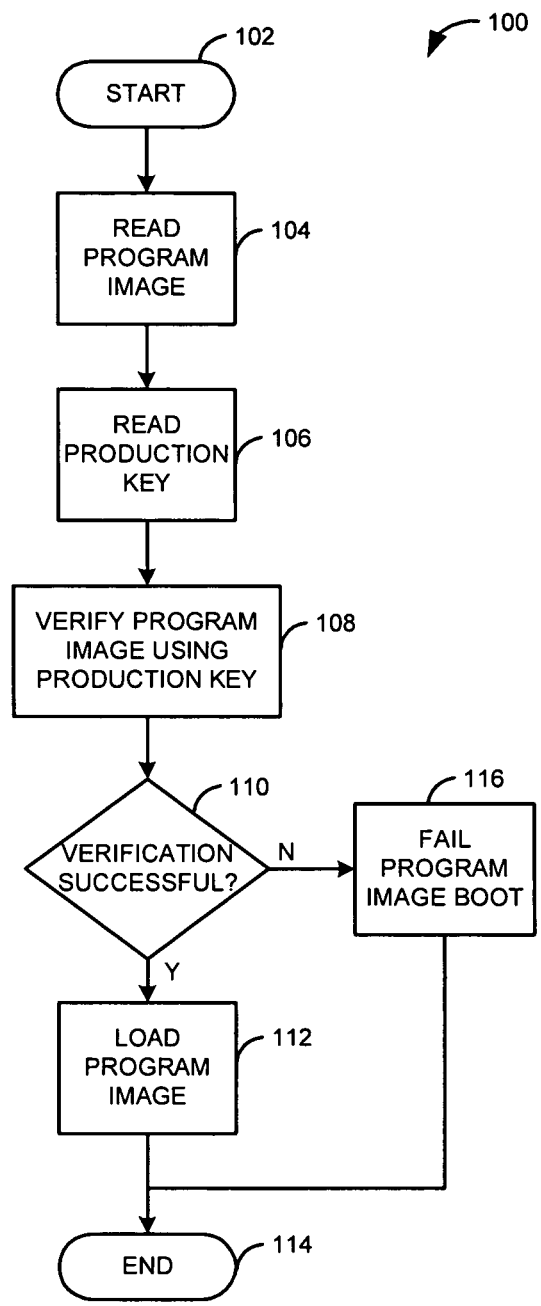
FIG. 1 is a flowchart depicting exemplary secure boot steps according to the prior art.

In one example, a circuit includes a circuit identification storage circuit and a control circuit. The circuit identification storage circuit stores circuit identification information that is unique to the circuit. The control circuit receives the circuit identification information and in response thereto selectively performs a secure boot procedure or a test boot procedure. The control circuit performs the secure boot procedure when the circuit identification information indicates that the circuit is a production circuit. The control circuit performs the test boot procedure when the circuit identification information indicates that the circuit is a test circuit. A related method is also disclosed.

Among other advantages, the circuit and method decreases program image development time by allowing a developer to bypass authentication of a program image for non-production processing circuits during the test boot procedure. In addition, the circuit and method allow for non-secure access to non-production processing circuits in order to debug non-production processing circuits during the test boot procedure. Furthermore, the circuit and method provide a test public key to be used for authentication of program images during the test boot procedure in order to reduce a chance of a production public key from being compromised. Other advantages will be recognized by those of ordinary skill in the art.

In one example, the circuit includes a memory circuit that stores boot information. The boot information includes secure mode override information, verification bypass information, and/or key selection information. The control circuit, when performing the test boot procedure, selectively overrides a secure mode of operation based on the secure mode override information. The control circuit allows a debug circuit non-secure access to the circuit when the secure mode of operation is overridden. The debug circuit is allowed access to modify the boot information when the secure mode of operation is overridden. In one example, the circuit includes a secure register and/or a secure clock. The debug circuit is allowed access to manipulate the secure register and/or the secure clock when the secure mode of operation is overridden.

In one example, the control circuit, when performing the test boot procedure, selectively bypasses verification of a program image based on the verification bypass information and loads a program image into at least one other memory circuit without verifying the program image in response to the verification bypass information. The control circuit can also verify a program image by selectively using a test key or a production key in response to the key selection information. The control circuit loads the program image into at least one other memory circuit after the program image has been verified.

In one example, a computer readable medium includes information that when executed by at least one processor causes the at least one processor to operate, design, and/or organize the circuit. In one example, the information includes hardware description language.

As used herein, the term "circuit" and/or "module" can include an electronic circuit, one or more processors (e.g., shared, dedicated, or group of processors such as but not limited to microprocessors, DSPs, or central processing units) and memory, that execute one or more software or firmware programs, combinational logic circuits, an ASIC, and/or other suitable components that provide the described functionality. A "circuit" or "module" can be "powered down" by reducing power to a desired reduced power level including to a level rendering it inoperative. Additionally, as will be appreciated by those of ordinary skill in the art, the operation, design, and organization, of a "circuit" or "module" can be described in a hardware description language such as Verilog™, VHDL, or other suitable hardware description languages.

Figure 2:
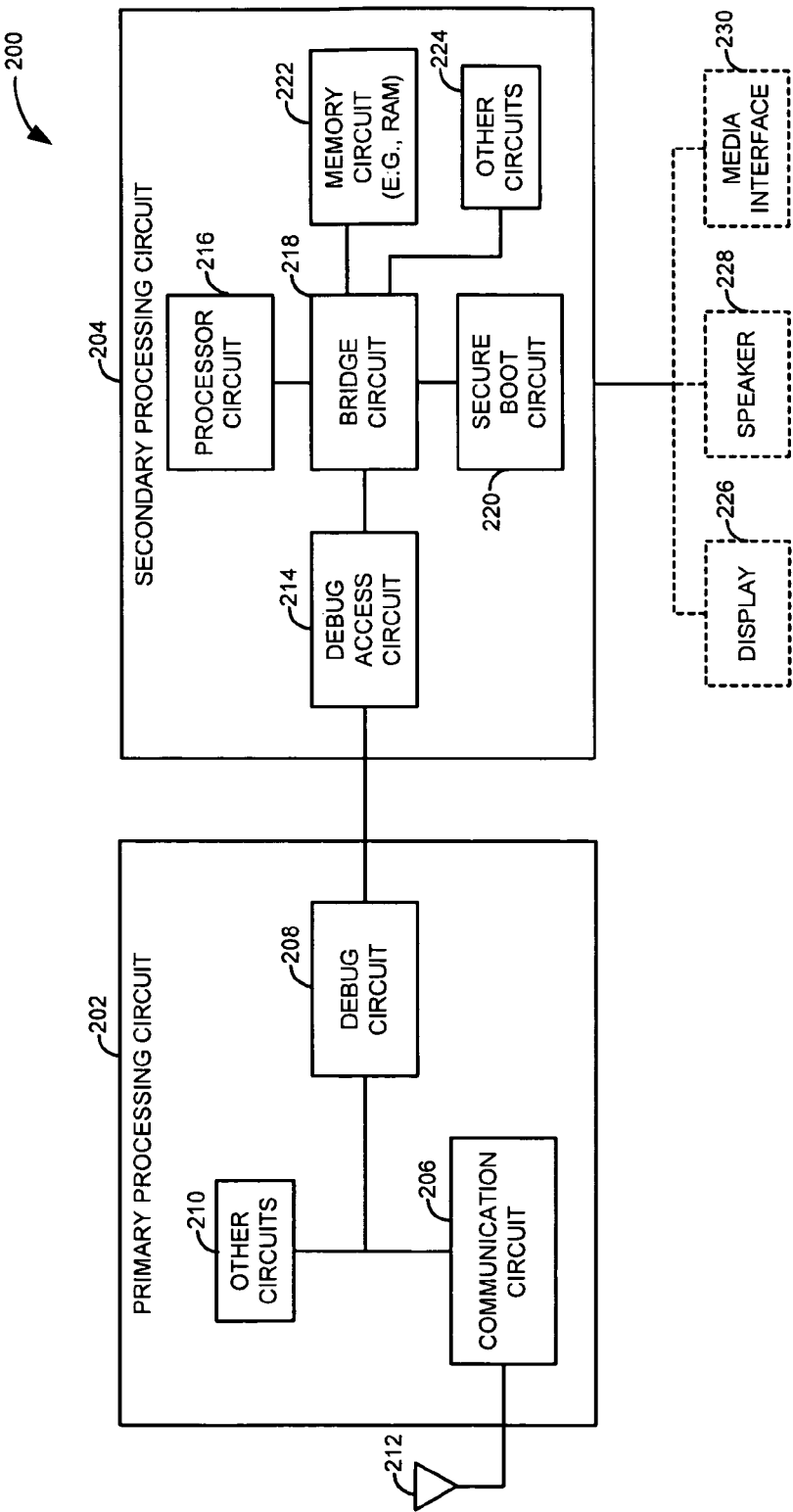
FIG. 2 is an exemplary block diagram of a device having a secure boot circuit.

Referring now to FIG. 2, an exemplary functional block diagram of a device 200 such as a handheld mobile media device, a cellular phone, and/or other suitable computing device is depicted. The device 200 includes a primary processing circuit 202 and a secondary processing circuit 204. In some embodiments, the primary processing circuit 202 handles primary functionality of the device 200 and the secondary processing circuit 204 handles secondary functionality of the device 200. For example, if the device 200 is a cellular phone capable of playing media files (e.g., audio and/or video media files), the primary processing circuit 202 can handle cellular communication functionality while the secondary processing circuit 204 can handle media processing functionality. In one embodiment, the device 200 can also include a display 226 and/or a speaker 228 in order to convey processed video and/or audio to a user. In another embodiment, the device 200 can include a media interface 230 (e.g., an audio and/or video jack) that is adapted to convey media information to an external device such as a speaker, display, and/or other suitable device.

In one embodiment, the primary processing circuit 202 can include a communication circuit 206, a debug circuit 208, an other suitable circuits 210. The communication circuit 206 can communicate with a remote communication circuit (e.g., a cell site) via an antenna 212 for example. The debug circuit 208, which is operatively coupled to the secondary processing circuit 204, is operative to access the secondary processing circuit 204 for debugging purposes.

The secondary processing circuit 204 includes a debug access circuit 214, a processor circuit 216, a bridge circuit 218, a secure boot circuit 220, a first memory circuit 222 (e.g., RAM), and other suitable secure circuits 224 such as one or more secure clocks, secure registers, and/or other suitable secure circuits. The bridge circuit 218 is operatively coupled to (and communicates information between) the debug access circuit 214, the processor circuit 216, the secure boot circuit 220, the first memory circuit 222, and the other circuits 224.

During operation, the secure boot circuit 220 selectively loads one or more program images into the first memory circuit 222 for execution by the processor circuit 216. Exemplary program images can include operating systems, application specific programs, and/or other suitable program images capable of being stored in memory and executed by a processor. In addition, the secure boot circuit 220 selectively allows the debug access circuit 214 non-secure access to the secondary processing circuit 204 including the processor circuit 216, the bridge circuit 218, the secure boot circuit 220, the first memory circuit 222, and/or the other circuits 224.

Figure 3:
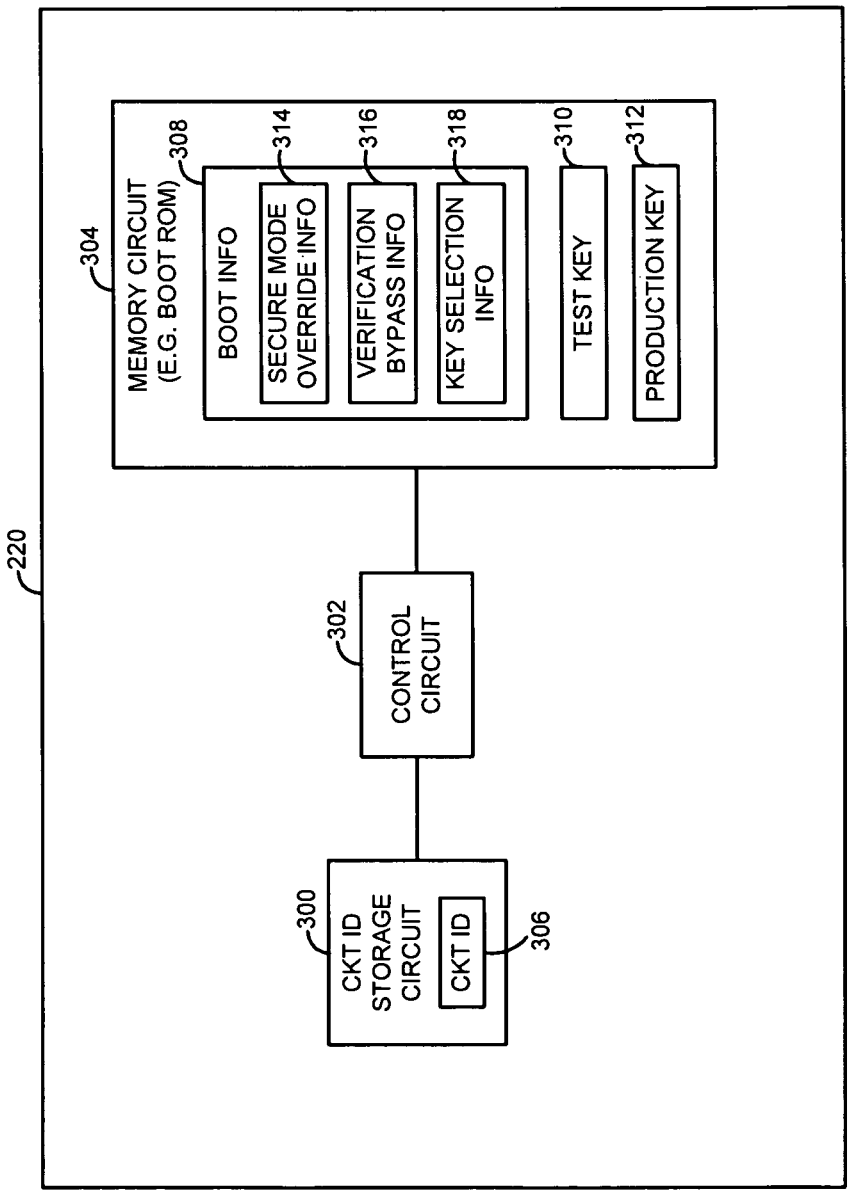
FIG. 3 is an exemplary block diagram of the secure boot circuit.

Referring now to FIG. 3, an exemplary functional block diagram of the secure boot circuit 220 is depicted. The secure boot circuit 220 includes a circuit identification storage circuit 300, a control circuit 302, and a second memory circuit 304. The circuit identification storage circuit 300 can be any suitable storage circuit that is capable of being written to only one time. For example, in one embodiment, the circuit identification storage circuit 300 can comprise an EFUSE as known in the art. The circuit identification storage circuit 300 stores circuit identification information 306 that is unique to the secondary processing circuit 204. The circuit identification information 306 is generally assigned to the secondary processing circuit 204 and permanently stored in the circuit identification storage circuit 300 during production.

The second memory circuit 304 can be any suitable storage circuit such as a boot ROM for example. The second memory circuit 304 stores boot information 308, a test public key 310, and a production public key 312. The boot information 308 includes secure mode override information 314, verification bypass information 316, and key selection information 318.

During operation, the control circuit 302 receives (or in some embodiments retrieves) the circuit identification information 306 from the circuit identification storage circuit 300. In response to the circuit identification information 306, the control circuit 302 selectively performs a secure boot procedure or a test boot procedure to load a program image into the first memory circuit 222. More specifically, the control circuit performs the secure boot procedure when the circuit identification information 306 indicates that the secondary processing circuit 220 is a production circuit. The control circuit 302 performs the test boot procedure when the circuit identification information 306 indicates that the secondary processing circuit 220 is not a production circuit. For example, the circuit identification information 306 can indicate that the secondary processing circuit 220 is a production circuit when it has been stored in the circuit identification storage circuit 300. In addition, the circuit identification information 306 can indicate that the secondary processing circuit 220 is not a production circuit when it is not present in the circuit identification storage circuit 300 or when it is set to a predetermined value (e.g., all zeros).

During the test boot procedure, the control circuit 302 selectively overrides a secure mode of operation of the secondary processing circuit 220 based on the secure boot override information 314. When the secure mode of operation is overridden, non-secure access is allowed to the secondary processing circuit 204 including the processor circuit 216, the bridge circuit 218, the secure boot circuit 220, the first memory circuit 222, and/or the other circuits 224. As such, the debug circuit 208 can, via the debug access circuit 214, manipulate various components of the secondary processing circuit 204 including any information stored therein. For example, the debug circuit 208 can change the boot information 308, the test public key 310, and/or the production public key 312. The debug circuit 208 can also reset (or toggle) any secure registers, clocks, and/or timers included in the other circuits 224.

In addition, during the test boot procedure, the control circuit 302 selectively bypasses verification of a program image, prior to loading it in the first memory circuit 222, based on the verification bypass information 316. For example, if the verification bypass information 316 indicates that verification is not required, the control circuit 302 can load the image into the first memory circuit 222 without verification. However, if the verification bypass information 316 indicates that verification is required, the control circuit 302 can verify the image by selectively using the test public key 310 or the production public key 312 in response to the key selection information 318. For example, if the key selection information 318 indicates that the test public key 310 is to be used, then the control circuit 302 verifies the image using the test public key 310. However, if the key selection information 318 indicates that the production public key 312 is to be used, the control circuit 302 verifies the image using the production public key 312. Once the image has been verified, the control circuit 302 loads the image into the first memory circuit 222 for execution by the processor circuit 216.

Figure 4:
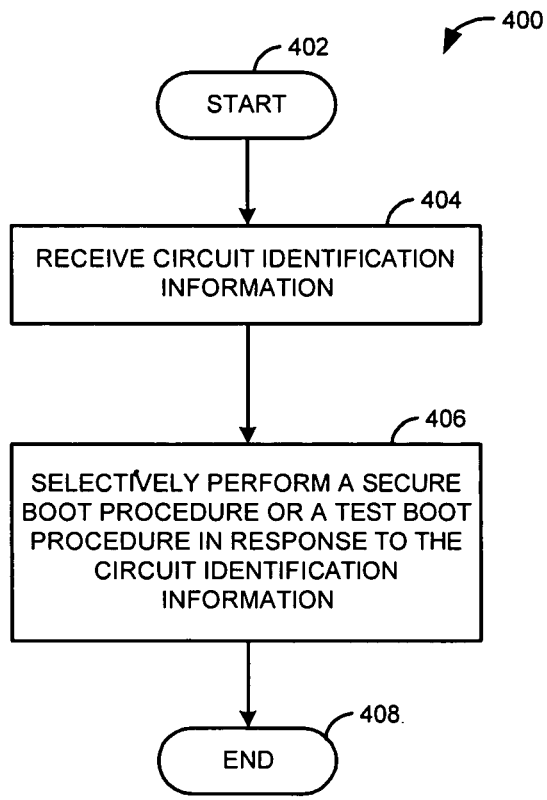
FIG. 4 is a flowchart depicting exemplary operations that can be performed by the secure boot circuit.

Referring now to FIG. 4, exemplary operations that can be performed by the control circuit 302 are generally identified at 400. The process starts at 402 when a program image is to be loaded into the first memory circuit 222 for execution by the processor circuit 216. At 404, the control circuit 302 receives the circuit identification information 306. At 406, the control circuit 302 selectively performs a secure boot procedure or a test boot procedure in response to the circuit identification information 306. The process ends at 408.

Figure 5:
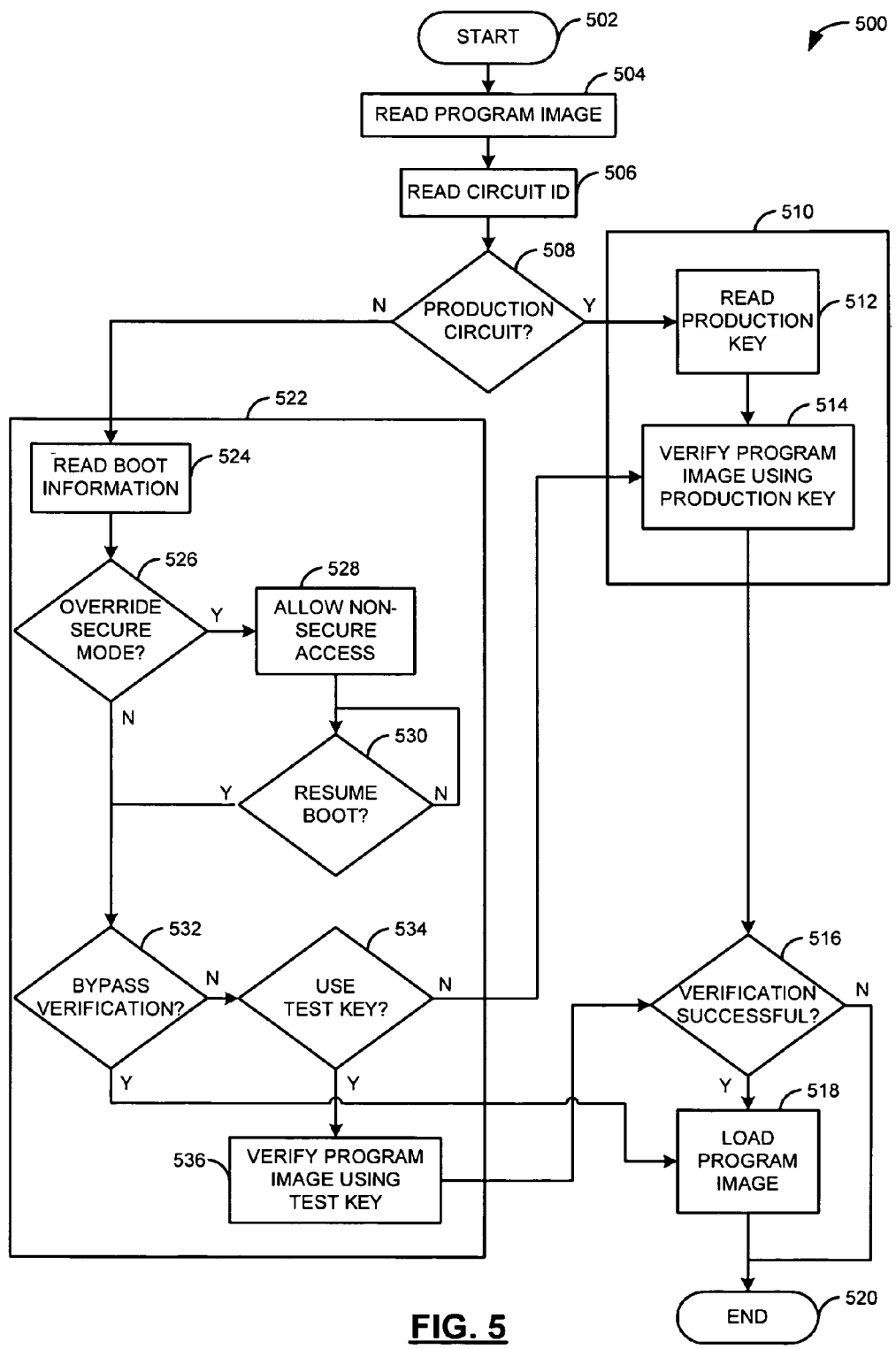
FIG. 5 is a flowchart depicting additional exemplary operations that can be performed by the secure boot circuit.

Referring now to FIG. 5, additional exemplary operations that can be performed by the control circuit 302 are generally identified at 500. The process starts at 502 when a program image is to be loaded into the first memory circuit 222 for execution by the processor circuit 216. At 504, the control circuit 302 reads the program image. At 506, the control circuit 302 reads the circuit identification information 306. At 508, the control circuit 302 determines whether the secondary processing circuit 204 is a production circuit. If the secondary processing circuit 204 is a production circuit, the control circuit 302 performs a secure boot procedure 510. During the secure boot procedure 510, the control circuit 302 reads the production public key 312 at 512 and then verifies the program image using the production public key 312 at 514. At 516, the control circuit 302 determines whether verification of the image was successful. If verification was successful, the control circuit 302 loads the image into the first memory circuit 222 at 518 and the process ends at 520. However, if verification was not successful, the control circuit 302 does not load the image and the process ends at 520.

If the control circuit 302 determines that the secondary processing circuit 204 is not a production circuit (e.g., a test circuit) at 508, the control circuit 302 performs a test boot procedure 522. During the test boot procedure 522, the control circuit 302 reads the boot information 308 from the second memory circuit 304 at 524. At 526, the control circuit determines whether the secure boot override information 314 indicates whether to override the secure mode of operation allowing non-secure access to the secondary processing circuit 204. If the secure boot override information 314 indicates that the secure mode of operation is to be overridden, the control circuit 302 allows non-secure access to the secondary processing circuit 204 at 528. As noted above, when the secure mode of operation is overridden, the debug circuit 208 has unrestricted access to manipulate various components of the secondary processing circuit 204 including any information stored therein.

At 530, the control circuit 302 determines whether it should resume the test boot procedure 522. If the control circuit 302 determines that it should not resume the test boot procedure 522, the process returns to 530. However, if the control circuit 302 determines that it should resume the test boot procedure 522, the process proceeds to 532. In one embodiment, the debug circuit 208 notifies the control circuit 302 when it has finished debugging the secondary processing circuit 204 and no longer requires non-secure access. In response to such notification, the control circuit 302 determines that it should resume the test boot procedure 522.

At 532, the control circuit 302 determines whether to bypass verification of the program image prior to loading it into the first memory circuit 222 based on the verification bypass information 316. If the control circuit 302 determines that the verification bypass information 316 indicates that verification is to be bypassed, the control circuit 302 loads the image into the first memory circuit 222 without verifying the image at 518. However, if the image is to be verified prior to loading it in the first memory circuit 222, the control circuit 302 determines whether to use the test public key 310 or the production public key 312 based on the key selection information 318 at 534. If the key selection information 318 indicates that the production public key 312 is to be used, the process proceeds to 514. However, if the key selection information 318 indicates that the test public key 310 is to be used, the process proceeds to 536. At 536, the control circuit 302 verifies the program image using the test public key 310 and the process proceeds to 516.

As noted above, among other advantages, the secure boot circuit and method decreases program image development time by allowing a developer to bypass authentication of a program image for non-production processing circuits. In addition, the circuit and method allow for non-secure access to non-production processing circuits in order to debug non-production processing circuits. Furthermore, the circuit and method provide a test public key to be used for authentication during software development in order to reduce a chance of the production public key from being compromised. Other advantages will be recognized by those of ordinary skill in the art.

Also, integrated circuit design systems (e.g., work stations) are known that create integrated circuits based on executable information stored on a computer readable memory such as but not limited to CDROM, RAM, other forms of ROM, hard drives, distributed memory etc. The information may include data representing (e.g., compiled or otherwise represented) any suitable language such as, but not limited to, hardware descriptor language or other suitable language. As such, the circuits and/or modules described herein can also be produced as integrated circuits by such systems. For example, an integrated circuit can be created for use in a display using information stored on a computer readable medium that when executed cause the integrated circuit design system to create an integrated circuit includes a circuit identification storage module and a control module. The circuit identification storage module stores circuit identification information. The control module receives the circuit identification information. In response to the circuit identification information, the control module selectively performs a secure boot procedure or a test boot procedure. Integrated circuits having a circuit and/or module that performs other operations described herein may also be suitable produced.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:
1. A control circuit comprising:
  a circuit identification storage module that is operative to store circuit identification information; and
  a control module that is operative to receive the circuit identification information identifying one of a plurality of processing circuits and to select either one of a secure boot procedure and a test boot procedure and perform the selected procedure, in response to the circuit identification information, wherein the secure boot procedure, when selected, verifies whether a program image is authorized to run on the identified processing circuit, and wherein the control module performs the secure boot procedure when the circuit identification information indicates that the processing circuit is a production circuit and the control module performs the test boot procedure when the circuit identification information indicates that the processing circuit is a test circuit.

2. The control circuit of claim 1 further comprising a memory module that is operative to store boot information, wherein the boot information includes at least one of secure mode override information, verification bypass information, and key selection information.

3. The control circuit of claim 2 wherein the control module is operative to selectively override a secure mode of operation based on the secure mode override information when performing the test boot procedure.

4. The control circuit of claim 3 wherein the control module is operative to allow a debug module non-secure access to the processing circuit when the secure mode of operation is overridden.

5. The control circuit of claim 4 wherein the debug module is allowed access to modify the boot information when the secure mode of operation is overridden.

6. The control circuit of claim 4 further comprising at least one of a secure register and a secure clock, wherein the debug module is allowed access to manipulate the at least one of the secure register and the secure clock when the secure mode of operation is overridden.

7. The control circuit of claim 2 wherein the control module is operative to selectively bypass verification of a program image based on the verification bypass information when performing the test boot procedure.

8. The control circuit of claim 2 wherein the control module is operative to load a program image into at least one other memory module without verifying the program image in response to the verification bypass information when performing the test boot procedure.

9. The control circuit of claim 2 wherein the control module is operative to verify a program image by selectively using one of a test key and a production key in response to the key selection information when performing the test boot procedure.

10. The control circuit of claim 2 wherein the control module is operative to load the program image into at least one other memory module after the program image has been verified.

11. A method of loading a program image comprising:
receiving circuit identification information identifying one of a plurality of processing circuits; and
selecting either one of a secure boot procedure and a test boot procedure and perform the selected procedure, in response to the circuit identification information,
wherein the secure boot procedure, when selected, verifies whether the program image is authorized to run on the identified processing circuit, and
wherein performing the secure boot procedure when the circuit identification information indicates that the processing circuit is a production circuit and performing the test boot procedure when the circuit identification information indicates that the processing circuit is a test circuit.

12. The method of claim 11 further comprising selectively overriding a secure mode of operation based on boot information that includes secure mode override information when performing the test boot procedure.

13. The method of claim 12 further comprising allowing a debug module non-secure access to the processing circuit when the secure mode of operation is overridden.

14. The method of claim 12 further comprising allowing access to modify at least one of a secure register, a secure clock, and the boot information when the secure mode of operation is overridden.

15. The method of claim 11 further comprising selectively bypassing verification of the program image based on verification bypass information when performing the test boot procedure.

16. The method of claim 11 further comprising loading the program image into memory of the processing circuit without verifying the program image in response to the verification bypass information when performing the test boot procedure.

17. The method of claim 11 further comprising verifying the program image by selectively using one of a test key and a production key in response to the key selection information when performing the test boot procedure.

18. The method of claim 17 further comprising loading the program image into memory of the processing circuit after the program image has been verified.

19. A non-transitory computer readable medium comprising information that when executed by at least one processor causes the at least one processor to:
at least one of: operate, design, and organize a control circuit, that comprises:
a circuit identification storage module that is operative to store circuit identification information; and
a control module that is operative to receive the circuit identification information identifying one of a plurality of processing circuits and to select either one of a secure boot procedure and a test boot procedure and perform the selected procedure, in response to the circuit identification information, wherein the secure boot procedure, when selected, verifies whether a program image is authorized to run on the identified processing circuit, and wherein the control module performs the secure boot procedure when the circuit identification information indicates that the processing circuit is a production circuit and the control module performs the test boot procedure when the circuit identification information indicates that the processing circuit is a test circuit.

20. The non-transitory computer readable medium of claim 19 wherein the information comprises hardware description language.

* * * * *